US012145821B2

(12) United States Patent
Galletti et al.

(10) Patent No.: US 12,145,821 B2
(45) Date of Patent: Nov. 19, 2024

(54) PEOPLE MOVER

(71) Applicant: KONE Corporation, Helsinki (FI)

(72) Inventors: Andrea Zotti Galletti, Helsinki (FI); Benjamin Ekström, Helsinki (FI); Giovanni Hawkins, Helsinki (FI); Nithil Karimpanackal Natarajan, Helsinki (FI)

(73) Assignee: KONE CORPORATION, Helsinki (FI)

(*) Notice: Subject to any disclaimer, the term of this patent is extended or adjusted under 35 U.S.C. 154(b) by 80 days.

(21) Appl. No.: 17/993,796

(22) Filed: Nov. 23, 2022

(65) Prior Publication Data

US 2023/0087024 A1 Mar. 23, 2023

Related U.S. Application Data

(63) Continuation of application No. PCT/FI2020/050430, filed on Jun. 16, 2020.

(51) Int. Cl.
*B66B 29/00* (2006.01)
*B66B 21/10* (2006.01)
(Continued)

(52) U.S. Cl.
CPC ............ *B66B 29/005* (2013.01); *B66B 27/00* (2013.01); *B66B 29/00* (2013.01); *B66B 21/10* (2013.01); *B66B 29/08* (2013.01)

(58) Field of Classification Search
CPC ....... B66B 29/005; B66B 29/00; B66B 27/00; B66B 29/08; B66B 21/10
(Continued)

(56) References Cited

U.S. PATENT DOCUMENTS 10,351,392 B1 * 7/2019 Gurvich ................. G06V 40/10
10,364,130 B2 * 7/2019 Chen ....................... G06T 7/248
(Continued)

FOREIGN PATENT DOCUMENTS

EP 3 205 618 A1 8/2017
FI 127155 B 12/2017
(Continued)

OTHER PUBLICATIONS

International Search Report for PCT/FI2020/050430 (PCT/ISA/210) mailed on Sep. 30, 2020.
(Continued)

*Primary Examiner* — James R Bidwell
(74) *Attorney, Agent, or Firm* — Birch, Stewart, Kolasch & Birch, LLP

(57) ABSTRACT

A people mover includes an endless conveying band and a control system. The control system includes a controller, a detecting arrangement for detecting people on the endless conveying band, and a signaling arrangement for providing visual and/or audio signals to people on the endless conveying band. The controller is configured to: determine based on output of the detecting arrangement, in particular based on signals and/or data generated by the detecting arrangement, whether a distance between detected people on the endless conveying band is below a minimum allowed distance; and present to people on the endless conveying band with a signaling arrangement alarm or instruction signals when a distance between detected people on the endless conveying band is below a minimum allowed distance.

20 Claims, 2 Drawing Sheets

(51) Int. Cl.
*B66B 27/00* (2006.01)
*B66B 29/08* (2006.01)

(58) Field of Classification Search
USPC .......................................................... 198/323
See application file for complete search history.

(56) References Cited

U.S. PATENT DOCUMENTS

| | | | | |
|---|---|---|---|---|
| 2007/0170037 | A1* | 7/2007 | Kuroda | B66B 5/0012 198/322 |
| 2018/0029841 | A1 | 2/2018 | Li et al. | |

FOREIGN PATENT DOCUMENTS

| | | | | | |
|---|---|---|---|---|---|
| JP | 2010-173747 | A | | 8/2010 | |
| JP | 2012-25495 | A | | 2/2012 | |
| KR | 10-2010-0032568 | A | | 3/2010 | |
| WO | WO-2013028101 | A2 | * | 3/2013 | G09F 19/22 |

OTHER PUBLICATIONS

Written Opinion of the International Searching Authority for PCT/FI2020/050430 (PCT/ISA/237) mailed on Sep. 30, 2020.

* cited by examiner

PEOPLE MOVER

CROSS REFERENCE TO RELATED APPLICATION

This application is a Continuation of PCT International Application No. PCT/FI2020/050430, filed on Jun. 16, 2020, which is hereby expressly incorporated by reference into the present application.

FIELD OF THE INVENTION

The invention relates to a people mover, which people mover is in particular an escalator, an autowalk or a moving ramp.

BACKGROUND OF THE INVENTION

Escalators, autowalks and moving ramps are people movers, each of which typically comprises an endless band of successively positioned conveying elements, such as steps or pallets for supporting the load to be transported, i.e. a person. The conveying element typically comprises a tread member with a tread surface on which a person can stand. The endless conveying band rotates in use and a passenger can step from a walking platform of the people mover on the portion, e.g. a conveying member, that emerges from below a walking platform.

In prior art, so as to facilitate swift and high flow of people to the people mover, a goal has been that the people are packed close to each other for the time of transport by the people mover. Dense positioning of people has been a goal since it increases use of capacity of the people mover and thereby the people flow.

When people are being moved by a people mover, they may occasionally end up being close to each other. People may arrive to the conveying band close to each other. Also, a person may start walking to be right behind someone else even if that person has arrived to the conveying band distant from each other. A person may also overtake another person.

It has been noticed that positioning of people close to each other makes them vulnerable to contagious diseases. For this reason, there is a need for a solution that could minimize exposure of individuals during their passage with a people mover.

BRIEF DESCRIPTION OF THE INVENTION

The object of the invention is to introduce a new people mover improved in terms of safety of its users. An object is to introduce a solution by which one or more of the above defined problems of prior art and/or problems discussed or implied elsewhere in the description can be solved. An object is particularly to introduce a solution which can simply yet efficiently be used for controlling distance of people in a people mover, particularly so that exposure of individuals to contagious diseases or other potentially harmful consequence of dense positioning during their passage with a people mover can be reduced while still allowing efficient people flow.

It is brought forward a new people mover comprising an endless conveying band and a control system comprising a controller. The people mover, in particular the control system thereof, comprises a detecting arrangement for detecting people on the endless conveying band; and a signaling arrangement for providing visual and/or audio signals to people on the endless conveying band. The controller is configured to determine based on output of the detecting arrangement, in particular based on signals and/or data generated by the detecting arrangement, whether distance between detected people on the endless conveying band is below a minimum allowed distance; and to present to people on the endless conveying band with signaling arrangement alarm or instruction signals when a distance between detected people on the endless conveying band is below a minimum allowed distance.

With this solution one or more of the above-mentioned objects can be achieved.

Preferable further details of the people mover are introduced in the following, which further details can be combined with the people mover individually or in any combination.

In a preferred embodiment, the detecting arrangement comprises

- at least one contactless sensor for sensing a person on the endless conveying band, preferably a proximity sensor or a light barrier sensor mounted on balustrade extending beside the endless conveying band; or
- one or more cameras, in particular focused to produce video or images of people on the endless conveying band; or
- load sensors mounted on the endless conveying band in locations distributed along the length of the endless conveying band, in particular for sensing load exerted on the endless conveying band in different locations thereof, e.g. load sensors mounted on different (preferably each) conveyor elements; or
- at least one load sensor mounted on a guide rail of the endless conveying band, in particular a guide rail for guiding the conveying elements thereof; or
- at least one acceleration sensor mounted on a guide rail of the endless conveying band, in particular a guide rail for guiding the conveying elements thereof.

In a preferred embodiment, the load sensor is a strain gauge or a pressure film sensor.

In a preferred embodiment, the signaling arrangement comprises one or more signaling devices.

In a preferred embodiment, the one or more signaling devices comprise one or more visual signaling devices, such as one or more displays, for presenting a visual signal and/or one or more speakers for presenting a voice signal.

In a preferred embodiment, the one or more signaling devices comprise

- one or more signaling devices mounted on the balustrade extending beside the endless conveying band; and/or
- one or more signaling devices mounted on the handrail extending beside the endless conveying band; and/or
- one or more signaling devices mounted on the endless conveying band, e.g. on conveyor elements; and/or
- one or more signaling devices mounted above the endless conveying band.

In a preferred embodiment, the controller is configured to determine based on output of the detecting arrangement, in particular based on signals and/or data generated by the detecting arrangement, whether a distance dependent parameter is within a range indicating that the distance is below a minimum allowed distance.

In a preferred embodiment, said distance dependent parameter is directly or indirectly proportional to the distance between detected people on the endless conveying band.

In a preferred embodiment, said distance dependent parameter is a frequency of load peaks of a load sensor mounted on a guide rail of the endless conveying band; or a frequency of acceleration peaks of an acceleration sensor mounted on a guide rail of the endless conveying band; or a frequency of detection signals of a contactless sensor; or duration of interval between two load peaks of a load sensor mounted on a guide rail of the endless conveying band: or duration of interval between two load peaks of a of an acceleration sensor mounted on a guide rail of the endless conveying band: or duration of interval between two detection signals of contactless sensor: or a distance, e.g. as measured or calculated, between two recognized objects in an image.

In a preferred embodiment, the controller is configured to determine based on output of the detecting arrangement, in particular based on signals and/or data generated by the detecting arrangement, whether a distance dependent parameter is within a range indicating that the distance is below a minimum allowed distance by determining whether a frequency of load peaks of a load sensor mounted on a guide rail of the endless conveying band is below a frequency threshold; or a frequency of acceleration peaks of an acceleration sensor mounted on a guide rail of the endless conveying band is below a frequency threshold; or a frequency of detection signals of a contactless sensor is below a frequency threshold; or duration of an interval between two load peaks of a load sensor is shorter than a threshold duration: or duration of an interval between two load peaks of a of an acceleration sensor is shorter than a threshold duration: or duration of an interval between two detection signals of contactless sensor is shorter than a threshold duration: or a distance, e.g. as measured or calculated, between two recognized objects in an image is below a threshold.

In a preferred embodiment, the controller is configured to determine based on output of the detecting arrangement, in particular based on signals and/or data generated by the detecting arrangement, whether simultaneous load sensor signals indicating a loaded state are obtained from load sensors that are closer than a threshold distance apart.

In a preferred embodiment, the a controller is configured to change the minimum allowed distance and/or the range indicating that the distance is below a minimum allowed distance when running speed of the conveying band is changed, in particular so that the minimum allowed distance is increased when running speed of the conveying band is increased, and so that the minimum allowed distance is reduced when running speed of the conveying band is reduced.

In a preferred embodiment, the controller is configured to determine based on output of the detecting arrangement, in particular based on signals and/or data generated by the detecting arrangement a value of said distance dependent parameter.

In a preferred embodiment, the minimum allowed distance is at least 1 meter, more preferably more. The minimum allowed distance being relatively long is advantageous since hereby safety is increased. The minimum allowed distance can be for example two meters or three meters or even longer.

In a preferred embodiment, the endless conveying band is guided by guide rails guided by which rollers of the conveying band roll. Preferably each conveying element comprises rollers arranged to roll along the guide rails.

In a preferred embodiment, the endless conveying band comprises plurality of conveying elements, such as steps or pallets, each of the conveying elements comprising a tread member with a tread surface on which a person can stand.

In a preferred embodiment, the controller comprises one or more microprocessors. The controller is preferably, although not necessarily configured to control rotation of a motor of the people mover and thereby running speed of the people mover. The controller can thus be responsible for plurality of escalator functions. Hereby, it can also simply take into account the speed of the conveying band. Also, it can access the signals and/or data generated by the detecting arrangement and and additionally use it for other control purposes than those related to distance between people.

In a preferred embodiment, the people mover is an escalator, an autowalk or a moving ramp.

BRIEF DESCRIPTION OF THE DRAWINGS

In the following, the present invention will be described in more detail by way of example and with reference to the attached drawings, in which FIG. 1 illustrate three dimensionally an end portion of a people mover according to a first embodiment.

The foregoing aspects, features and advantages of the invention will be apparent from the drawings and the detailed description related thereto.

DETAILED DESCRIPTION

Figure 1:
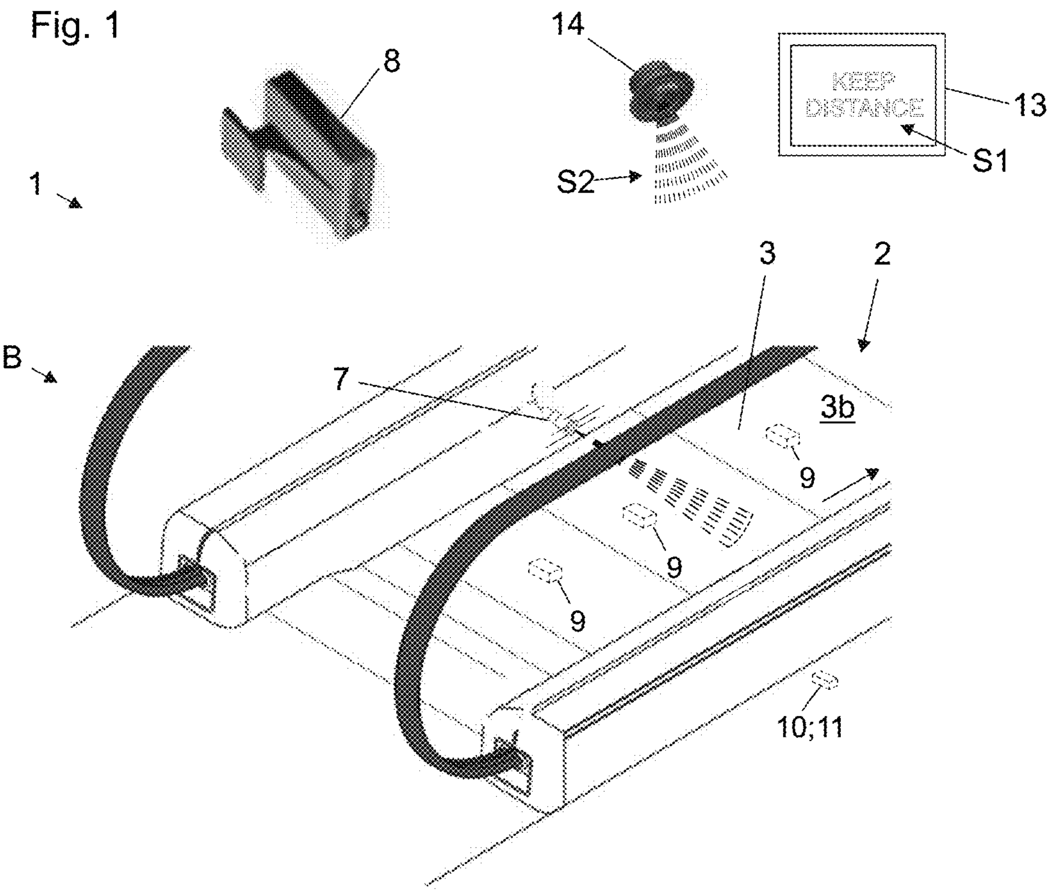
Figure 2:
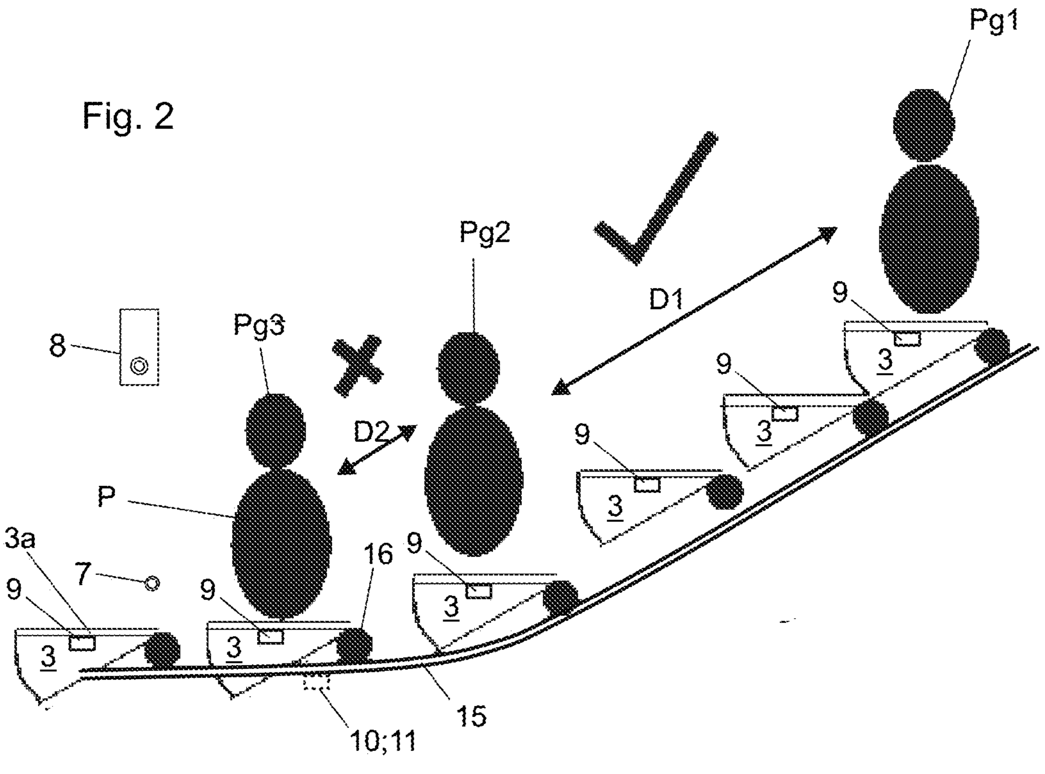
FIG. 2 illustrate partially the end position of a people mover of FIG. 1 as viewed from a side.
Figure 3:
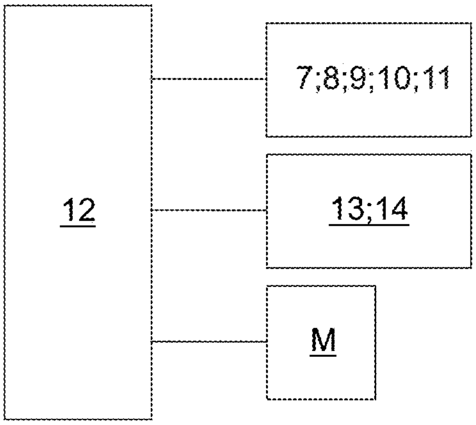
FIG. 3 illustrates as a block diagram preferred details of the control system of the people mover of FIGS. 1 and 2 and the connections of parts thereof.

FIG. 1 illustrates a people mover 1, comprising an endless conveying band 2. The people mover 1 of FIG. 1 moreover comprises a control system 7-14 comprising a controller 12, as illustrated in FIG. 3. The people mover 1, in particular said control system thereof, moreover comprises a detecting arrangement 7;8;9;10;11 for detecting people on the endless conveying band 2; and a signaling arrangement 13;14 for providing visual and/or audio signals to people on the endless conveying band 2. The controller 12 is configured to determine based on output of the detecting arrangement 7;8;9;10;11), in particular based on signals and/or data generated by the detecting arrangement 7;8;9;10;11, whether distance D1, D2 between detected people Pg1-Pg3 (also referred to as persons and passengers) on the endless conveying band 2 is below a minimum allowed distance; and to present to people on the endless conveying band 2 with signaling arrangement 13 and/or 14 alarm or instruction signals S1; S2 when a distance between detected people on the endless conveying band 2 is below a minimum allowed distance. FIG. 2 illustrates partially the people mover 1 of FIG. 1 from a side.

In the example of FIG. 2, the distance D1 between passengers Pg1 and Pg2 is above a minimum allowed distance which is indicated in FIG. 2 by the symbol √, and the distance D2 between passengers Pg2 and Pg3 is below a minimum allowed distance which is indicated in FIG. 2 by the symbol x.

In FIGS. 1 and 2, the endless conveying band 2 of the people mover comprises plurality of conveying elements 3 each of the conveying elements 3 comprising a tread member 3*b* with a tread surface 3*a* on which a person can stand. The conveying elements 2 are connected together e.g. by a chain to which the conveying elements 2 are engaged. The endless conveying band 2 is preferably guided by guide rails 15 guided by which rollers 16 of the conveying band 2 roll. The arrow shows the direction of movement of the conveying elements 2. The people mover 1 preferably comprises a motor M (not showed in FIG. 1 or 2) for moving the endless conveying band 2. The people mover 1 illustrated in FIGS. 1 and 2 is in particular an escalator and the conveying elements 2 are steps.

In FIGS. 1 and 2, alternative detecting devices 7-11 of the signaling arrangement are shown, which may be used in parallel but this is not necessary. As one preferred alternative, the detecting arrangement 7;8;9;10;11 comprises at least one contactless sensor 7 for sensing a person on the endless conveying band 2, preferably a proximity sensor or a light barrier sensor mounted on balustrade extending beside the endless conveying band 2. This alternative provides that the solution is reliable and simple to implement with widely used components for people detection. As another preferred alternative, the detecting arrangement 7;8;9;10;11 comprises at least one camera 8, in particular focused to produce video or images of people on the endless conveying band 2. This alternative provides that the solution can be provided easily as an add-on feature. As a further preferred alternative, the detecting arrangement 7;8;9;10;11 comprises load sensors 9 mounted on the endless conveying band 2 in locations distributed along the length of the endless conveying band 2, in particular for sensing load exerted on the endless conveying band 2 in different locations thereof, e.g. load sensors 9 mounted being on different (preferably each) conveyor elements 3. This alternative provides a very reliable detection without visible components. As a further preferred alternative, the detecting arrangement 7;8;9;10;11 comprises at least one load sensor 10 mounted on a guide rail 15 of the endless conveying band 2, in particular a guide rail 15 for guiding the conveying elements thereof. This alternative provides a very reliable detection without visible components and with small amount of components. As a further preferred alternative, the detecting arrangement 7;8;9;10;11 comprises at least one acceleration sensor 11 mounted on a guide rail 15 of the endless conveying band 2, in particular a guide rail 15 for guiding the conveying elements thereof. This alternative provides a very reliable detection without visible components and with small amount of components. Generally preferably, the aforementioned load sensor 9; 10 is a strain gauge or a pressure film sensor.

In FIGS. 1 and 2, alternative signaling devices 13, 14 of the signaling arrangement 13;14 are shown, which signaling devices 13, 14 may be used in parallel but this is not necessary. The signaling arrangement 13;14 comprises one or more signaling devices 13;14. The one or more signaling devices 13;14 preferably comprise one or more visual signaling devices 13, such as one or more displays, for presenting a visual signal S1 and/or one or more speakers 14 for presenting a voice signal S2. The one or more signaling devices 13;14 can be mounted on any location where they can give signals to the people on the band 2, such as for example on the balustrade extending beside the endless conveying band 2 or on the moving handrail extending beside the endless conveying band 2 or on the endless conveying band 2, e.g. on conveyor elements 3 or above the endless conveying band 2.

The signaling arrangement 13;14 preferably comprises at least one signaling device 13;14 focused to provide visual and/or audio signals to people on the endless conveying band 2 at proximity of a location where the detection arrangement 7;8;9;10;11 is located. Thus, when a distance between detected people on the endless conveying band 2 is below a minimum allowed distance, the person who is too close to another person can be instructed by a signaling device 12;14.

The visual signal S1 can be an instruction text, for example. The text can contain a request to increase distance to another person, for example, or tell that the distance to another person is too short. The voice signal S2 can be an alarm sound, or a recorded spoken message requesting to increase distance to another person, for example, or telling that the distance to another person is too short.

The controller 12 is configured to determine based on output of the detecting arrangement 7;8;9;10;11, in particular based on signals and/or data generated by the detecting arrangement 7;8;9;10;11, whether a distance dependent parameter is within a range indicating that the distance is below a minimum allowed distance. In general, said term distance dependent parameter in this application is considered to means that the value of the parameter is dependent on the distance between detected people on the endless conveying band 2. The controller 12 is configured to perform said determining whether a distance dependent parameter is within a range indicating that the distance is below a minimum allowed distance with a computer program, for instance. The computer program can be arranged to run on the controller 12, such as in particular on a computer or equivalent comprised in the controller 12, for instance.

Said distance dependent parameter is preferably, although not necessarily, directly or inversely proportional to the distance between detected people on the endless conveying band 2. For example, a distance, e.g. the number of pixels, between two recognized people in an image is directly proportional to the distance between those people. On the other hand, an interval (=amount of time passed) between the moments when successive two persons are located at the same location is inversely proportional to the distance between those people. There are numerous possible alternatives for a distance dependent parameter which is directly or inversely proportional to the distance between detected people on the endless conveying band 2. Said parameter can be a frequency, time interval between detections, distance detected from an image, number of tread unloaded tread member, for example, but not limiting to these examples. It is, however, not necessary that the dependence is directly or inversely proportional, since the distance dependent parameter can alternatively correlate in some other e.g. non-linear manner with the distance.

Figure 4:
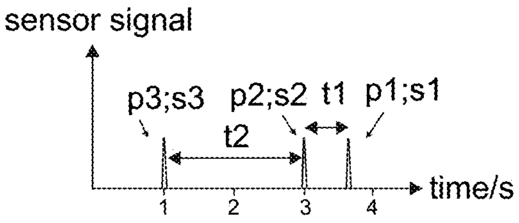
FIG. 4 illustrates sensor signals as function of time.

In a first preferred embodiment, said distance dependent parameter is a frequency of load peaks of a load sensor 10 mounted on a guide rail 15 of the endless conveying band 2, the range being that the frequency is below a frequency threshold. This embodiment works as follows. When a people, i.e. a passenger, is transported on the conveying band 2 over the location where the sensor is positioned, the sensor experiences a load peak, and the next passenger will cause another load peak. The frequency of load peaks is then inversely proportional to the distance between the passengers. In FIG. 4, a sensor signal in function of time is illustrated. The illustrated example applies in a case where the sensor signal is from a load sensor 10 mounted on a guide rail 15 of the endless conveying band 2, as illustrated in FIGS. 1 and 2. When passenger Pg1, as illustrated in FIG. 2, is transported on the conveying band 2 over the location where the sensor 10 is positioned, the sensor 10 experiences a load peak p1 as illustrated in FIG. 4. The next passenger Pg2 will cause the following load peak p2 in FIG. 4, and again the next passenger Pg3 will cause the following load peak p3 in FIG. 4. The controller 12 can be configured to determine the frequency of load peaks of a load sensor 10 e.g. based on time t1; t2 elapsed between successive load peaks p1 and p2; p2, p3.

In a second preferred embodiment, said distance dependent parameter is duration of an interval t1, t2 between two load peaks of a load sensor 10 mounted on a guide rail 15 of the endless conveying band 2, the range being that the duration of the interval t1, t2 is below a threshold duration. This embodiment works as follows. When a people, i.e. a passenger, is transported on the conveying band 2 over the location where the load sensor 10 is positioned, the sensor 10 experiences a load peak, and the next passenger will cause another load peak. The duration of an interval t1, t2 between load peaks is then directly proportional to the distance between the passengers. In FIG. 4, a sensor signal in function of time is illustrated. The illustrated example applies in a case where the sensor signal is from a load sensor 10 mounted on a guide rail 15 of the endless conveying band 2, as illustrated in FIGS. 1 and 2. When a passenger Pg1, as illustrated in FIG. 2, is transported on the conveying band 2 over the location where the sensor 10 is positioned, the sensor 10 experiences a load peak p1 as illustrated in FIG. 4. The next passenger Pg2 will cause the following load peak p2 in FIG. 4, and again the next passenger Pg3 will cause the following load peak p3 in FIG. 4. The controller 12 can be configured to determine duration of an interval t1, t2 between load peaks of the load sensor 10 e.g. based on time t1; t2 elapsed between successive load peaks p1 and p2; p2, p3.

In a third preferred embodiment, said distance dependent parameter is a frequency of acceleration peaks of an acceleration sensor 11 mounted on a guide rail 15 of the endless conveying band 2, the range being that the frequency is below a frequency threshold. This embodiment works as follows. When a people, i.e. a passenger, is transported on the conveying band 2 over the location where the sensor is positioned, the sensor experiences a acceleration peak, and the next passenger will cause another acceleration peak. The frequency of acceleration peaks is then inversely proportional to the distance between the passengers. In FIG. 4, a sensor signal in function of time is illustrated. The illustrated example applies in a case where the sensor signal is from a acceleration sensor 11 mounted on a guide rail 15 of the endless conveying band 2, as illustrated in FIGS. 1 and 2. When passenger Pg1, as illustrated in FIG. 2, is transported on the conveying band 2 over the location where the sensor 11 is positioned, the sensor 11 experiences a acceleration peak p1 as illustrated in FIG. 4. The next passenger Pg2 will cause the following acceleration peak p2 in FIG. 4, and again the next passenger Pg3 will cause the following acceleration peak p3 in FIG. 4. The controller 12 can be configured to determine the frequency of acceleration peaks of a acceleration sensor 11 e.g. based on time t1; t2 elapsed between successive acceleration peaks p1 and p2; p2 and p3.

In a fourth preferred embodiment, said distance dependent parameter is duration of an interval t1, t2 between two acceleration peaks of a acceleration sensor 11 mounted on a guide rail 15 of the endless conveying band 2, the range being that the duration of the interval t1, t2 is below a threshold duration. This embodiment works as follows. When a person, i.e. a passenger, is transported on the conveying band 2 over the location where the sensor is positioned, the sensor experiences a acceleration peak, and the next passenger will cause another acceleration peak. The duration of an interval t1, t2 between two acceleration peaks is then directly proportional to the distance between the passengers. In FIG. 4, a sensor signal in function of time is illustrated. The illustrated example applies in a case where the sensor signal is from an acceleration sensor 11 mounted on a guide rail 15 of the endless conveying band 2, as illustrated in FIGS. 1 and 2. When passenger Pg1, as illustrated in FIG. 2, is transported on the conveying band 2 over the location where the sensor 11 is positioned, the sensor 11 experiences a acceleration peak p1 as illustrated in FIG. 4. The next passenger Pg2 will cause the following acceleration peak p2 in FIG. 4, and again the next passenger Pg3 will cause the following acceleration peak p3 in FIG. 4. The controller 12 can be configured to determine the duration of an interval t1, t2 between two acceleration peaks of a acceleration sensor 11 e.g. by measuring the time t1; t2 elapsed between successive acceleration peaks p1 and p2; p2 and p3.

In a fifth preferred embodiment, said distance dependent parameter is a frequency of detection signals of contactless sensor 7, the range being that the frequency of detection signals is below a frequency threshold. This embodiment works for example as follows. When a person, i.e. a passenger, is transported on the conveying band 2 beside the location where the sensor 7 is positioned, the beam or equivalent of the sensor 7 is interfered by the passenger so that it provides a detection signal to the controller 12 which signal is different from the signal being provided when the beam is not interfered by a passenger, and the next passenger will cause another corresponding detection signal being provided by the sensor 7 to the controller 12. The frequency of detection signals is then inversely proportional to the distance between the passengers. In FIG. 4, a sensor signal in function of time is illustrated. The illustrated example applies in a case where the detection signal is from a contactless sensor 7, such as a proximity sensor or a light barrier sensor mounted on balustrade B extending beside the endless conveying band 2, as illustrated in FIGS. 1 and 2. When passenger Pg1, as illustrated in FIG. 2, is transported on the conveying band 2 past the location where the sensor 7 is positioned, the sensor 7 provides a detection signal s1 as illustrated in FIG. 4. The next passenger Pg2 will cause the following detection signal s2 in FIG. 4, and again the next passenger Pg3 will cause the following detection signal s3 in FIG. 4. The controller 12 can be configured to determine the frequency of detection signals d1-d3 e.g. based on time t1; t2 elapsed between successive detection signals d1 and d2; d2 and d3.

In a sixth preferred embodiment, said distance dependent parameter is duration of an interval t1, t2 between two detection signals d1 and d2; d2 and d3 of contactless sensor 7, the range being that the duration of the interval t1, t2 is below a threshold duration. This embodiment works for example as follows. When a person, i.e. a passenger, is transported on the conveying band 2 beside the location where the sensor 7 is positioned, the beam or equivalent of the sensor 7 is interfered by the passenger so that it provides a detection signal to the controller 12 which signal is different from the signal being provided when the beam is not interfered by a passenger, and the next passenger will cause another corresponding detection signal being provided by the sensor 7 to the controller 12. The duration of an interval t1, t2 between two detection signals is then directly proportional to the distance between the passengers. In FIG. 4, a sensor signal in function of time is illustrated. The illustrated example applies in a case where the detection signal is from a contactless sensor 7, such as a proximity sensor or a light barrier sensor mounted on balustrade B extending beside the endless conveying band 2, as illustrated in FIGS. 1 and 2. When passenger Pg1, as illustrated in FIG. 2, is transported on the conveying band 2 past the location where the sensor 7 is positioned, the sensor 7 provides a detection signal s1 as illustrated in FIG. 4. The next passenger Pg2 will cause the following detection signal s2 in FIG. 4, and again the next passenger Pg3 will cause the following detection signal s3 in FIG. 4. The controller 12 can be configured to determine duration of an interval t1, t2 between two detection signals s1 and s2; s2 and s3 e.g. by measuring the time t1; t2 elapsed between successive detection signals s1 and s2; s2 and d3.

In a seventh preferred embodiment, said distance dependent parameter is a distance, e.g. as measured or calculated, between two recognized objects (people) in an image, the range being that the distance is below a threshold.

In a different type of embodiment, the controller 12 is configured to determine based on output of the detecting arrangement 9, in particular based on signals and/or data generated by the detecting arrangement 9, whether simultaneous load sensor signals indicating a loaded state are obtained from load sensors 9 that are closer than a threshold distance apart. In this embodiment, the detecting arrangement 9 preferably comprises load sensors 9 mounted on the endless conveying band 2 in locations distributed along the length of the endless conveying band 2, in particular for sensing load exerted on the endless conveying band 2 in different locations thereof, e.g. the load sensors 9 being mounted on different (preferably each) conveyor elements 3. When a first person and a second person, i.e. a passengers, stand on conveying elements 3 of the conveying band 2 that are close to each other, e.g. immediately successive to each other, this can be regarded to be too close.

In general, the controller 12 is preferably configured to change the aforementioned minimum allowed distance, and in particular for this purpose the aforementioned range indicating that the distance is below a minimum allowed distance, when running speed of the conveying band 2 is changed. The change is performed in particular so that the minimum allowed distance is increased when running speed of the conveying band 2 is increased, and so that the minimum allowed distance is reduced when running speed of the conveying band 2 is reduced. The needed change of the range depends on the manner in which the dependency of the distance dependent parameter, e.g. whether the dependence direct or inverse, for instance. Accordingly, a threshold of the range can be either lowered or raised for carrying out the change.

In general, preferably the controller 12 is configured to determine based on output of the detecting arrangement 7;8;9;10;11, in particular based on signals and/or data generated by the detecting arrangement 7;8;9;10;11 a value of said distance dependent parameter. Thus, determination of whether said distance dependent parameter is within a range can be performed using comparison of the value.

In general, the controller 12 preferably comprises one or more microprocessors. The controller 12 can be responsible for plurality of escalator functions, but this is not necessary. Preferably, the controller 12 is configured to control rotation of a motor M of the people mover and thereby running speed of the people mover 1, as illustrated in FIG. 3. A computer program may be arranged to run on the controller 12 which program performs tasks of the controller 12.

The minimum allowed distance can be set in the controller 12 and it may be modifiable by the controller 12. The minimum allowed distance can be for example 1 meter, but preferably it is bigger because safety is improved in function of the minimum allowed distance. It is however more preferable that the minimum allowed distance becomes defined as a result of the range of the distance dependent parameter. Thus, it is not necessary that the controller 12 determines a value for the actual distance between detected people.

In general, the camera 8 may be any known camera device. The controller 11 can be configured to process data, in particular videos and/or images, produced by the camera 8, e.g. by analyzing the data with image recognition software configured to detect people from the data. The analyzing preferably moreover comprises determining distances between people.

The arrangement preferably moreover comprises visual instructions 9 e.g. provided on the conveying band 2, e.g. on plurality of conveying elements 3 thereof. Thus, the people may be informed how far they should position relative to other people and thus the detection and instruction process is simplified due to not becoming overloaded.

Generally preferably the people mover 1 is an escalator, an autowalk or a moving ramp. In the first case, the conveying elements 2 are preferably steps, and in the second and third cases, the conveying elements 2 are preferably pallets. However, in general at least part of the advantages of the invention could be achieved also if the endless conveying band is an endless belt or equivalent.

Generally it is possible, although not necessary, that the controller 12 is moreover, as a second reaction if the alarm or instructing does not work, configured to trigger stopping of the movement of the band 2 if the detected the distance between detected people on the endless conveying band 2 is below a second minimum allowed distance which is even shorter than the above mentioned minimum allowed distance. The second minimum allowed distance can thus trigger stopping of the people mover when the density of people is excessively high.

It is to be understood that the above description and the accompanying Figures are only intended to teach the best way known to the inventors to make and use the invention. It will be apparent to a person skilled in the art that the inventive concept can be implemented in various ways. The above-described embodiments of the invention may thus be modified or varied, without departing from the invention, as appreciated by those skilled in the art in light of the above teachings. It is therefore to be understood that the invention and its embodiments are not limited to the examples described above but may vary within the scope of the claims.

The invention claimed is:

1. A people mover, comprising:

an endless conveying band; and a control system comprising:

a controller;

a detecting arrangement for detecting people on the endless conveying band, the detecting arrangement including a plurality of sensors distributed along a length of the endless conveying band; and a signaling arrangement for providing visual and/or audio signals to people on the endless conveying band, wherein the controller is configured to:

determine based on output of the detecting arrangement whether a distance in a longitudinal direction of the endless conveying band between detected people on the endless conveying band is below a minimum allowed distance; and present to people on the endless conveying band with a signaling arrangement alarm or instruction signals when the distance between the detected people on the endless conveying band is below the minimum allowed distance.

2. The people mover according to claim 1, wherein the detecting arrangement comprises:

at least one contactless sensor for sensing a person on the endless conveying band; or at least one camera; or load sensors mounted on the endless conveying band in locations distributed along a length of the endless conveying band; or at least one load sensor mounted on a guide rail of the endless conveying band; or at least one acceleration sensor mounted on a guide rail of the endless conveying band.

3. The people mover according to claim 1, wherein each of the plurality of sensors is a strain gauge or a pressure film sensor.

4. The people mover according to claim 1, wherein the signaling arrangement comprises one or more signaling devices.

5. The people mover according to claim 4, wherein the one or more signaling devices comprise one or more visual signaling devices for presenting a visual signal and/or one or more speakers for presenting a voice signal.

6. The people mover according to claim 4, wherein the one or more signaling devices comprise:

one or more signaling devices mounted on a balustrade extending beside the endless conveying band; and/or one or more signaling devices mounted on a handrail extending beside the endless conveying band; and/or one or more signaling devices mounted on the endless conveying band; and/or one or more signaling devices mounted above the endless conveying band.

7. The people mover according to claim 1, wherein the controller is configured to determine based on the output of the detecting arrangement whether a distance dependent parameter is within a range indicating that the distance is below the minimum allowed distance.

8. The people mover according to claim 7, wherein said distance dependent parameter is directly or indirectly proportional to the distance between detected people on the endless conveying band.

9. The people mover according to claim 7, wherein said distance dependent parameter is:

a frequency of load peaks of a load sensor mounted on a guide rail of the endless conveying band; or a frequency of acceleration peaks of an acceleration sensor mounted on a guide rail of the endless conveying band; or a frequency of detection signals of the contactless sensor; or a duration of interval between two load peaks of a load sensor mounted on a guide rail of the endless conveying band: or a duration of interval between two load peaks of an acceleration sensor mounted on a guide rail of the endless conveying band; or a duration of interval between two detection signals of the contactless sensor; or a distance between two recognized objects in an image.

10. The people mover according to claim 1, wherein the controller is configured to determine based on the output of the detecting arrangement whether a distance dependent parameter is within a range indicating that the distance is below the minimum allowed distance by determining whether:

a frequency of load peaks of a load sensor mounted on a guide rail of the endless conveying band is below a frequency threshold; or a frequency of acceleration peaks of an acceleration sensor mounted on a guide rail of the endless conveying band is below a frequency threshold; or a frequency of detection signals of a contactless sensor is below a frequency threshold; or a duration of an interval between two load peaks of a load sensor is shorter than a threshold duration; or a duration of an interval between two load peaks of a of an acceleration sensor is shorter than a threshold duration; or a duration of an interval between two detection signals of contactless sensor is shorter than a threshold duration; or a distance between two recognized objects in an image is below a threshold.

11. The people mover according to claim 1, wherein the controller is configured to determine based on the output of the detecting arrangement whether simultaneous load sensor signals indicating a loaded state are obtained from load sensors that are closer than a threshold distance apart.

12. The people mover according to claim 1, wherein the controller is configured to change the minimum allowed distance and/or a range indicating that the distance-is below the minimum allowed distance, when a running speed of the conveying band is changed, so that the minimum allowed distance is increased when the running speed of the conveying band is increased, and so that the minimum allowed distance is reduced when the running speed of the conveying band is reduced.

13. The people mover according to claim 1, wherein the controller is configured to determine based on the output of the detecting arrangement a value of a distance dependent parameter.

14. The people mover according to claim 1, wherein the minimum allowed distance is at least 1 meter.

15. The people mover according to claim 1, wherein the output of the detecting arrangement is based on signals and/or data generated by the detecting arrangement.

16. The people mover according to claim 1, wherein the detecting arrangement comprises:

at least one contactless sensor for sensing a person on the endless conveying band, the at least one contactless sensor being a proximity sensor or a light barrier sensor mounted on a balustrade extending beside the endless conveying band; or at least one camera focused to produce video or images of people on the endless conveying band; or load sensors mounted on the endless conveying band in locations distributed along a length of the endless conveying band for sensing a load exerted on the endless conveying band in different locations thereof, the load sensors being mounted on different conveyor elements; or at least one load sensor mounted on a guide rail of the endless conveying band for guiding the conveying elements of the endless conveying band; or at least one acceleration sensor mounted on a guide rail of the endless conveying band for guiding the conveying elements of the endless conveying band.

17. The people mover according to claim 4, wherein the one or more signaling devices comprise one or more displays for presenting a visual signal and/or one or more speakers for presenting a voice signal.

18. The people mover according to claim 2, wherein the load sensor is a strain gauge or a pressure film sensor.

19. The people mover according to claim 2, wherein the signaling arrangement comprises one or more signaling devices.

20. The people mover according to claim 3, wherein the signaling arrangement comprises one or more signaling devices.

* * * * *